United States Patent
Maesono (10) Patent No.: US 8,359,134 B2
(45) Date of Patent: Jan. 22, 2013

(54) IN-VEHICLE COMPONENT ASSESSMENT SYSTEM

(75) Inventor: Noboru Maesono, Tokyo (JP)

(73) Assignee: Isuzu Motors Limited, Tokyo (JP)

( * ) Notice: Subject to any disclaimer, the term of this patent is extended or adjusted under 35 U.S.C. 154(b) by 1209 days.

(21) Appl. No.: 11/815,770

(22) PCT Filed: Nov. 15, 2005

(86) PCT No.: PCT/JP2005/020915
§ 371 (c)(1),
(2), (4) Date: Aug. 8, 2007

(87) PCT Pub. No.: WO2006/087852
PCT Pub. Date: Aug. 24, 2006

(65) Prior Publication Data
US 2009/0012668 A1    Jan. 8, 2009

(30) Foreign Application Priority Data

Feb. 21, 2005  (JP) .................................. 2005-044881

(51) Int. Cl.
*G06F 17/18* (2006.01)
(52) U.S. Cl. ............ 701/29.1; 701/29.4; 701/29.6; 701/30.9; 701/31.4; 701/31.9; 701/32.1; 701/32.7; 701/33.4; 701/34.2; 307/9.1; 307/10.1; 702/179; 702/182; 702/183; 702/184
(58) Field of Classification Search ............ 701/1, 2, 701/19, 21–35, 50, 70, 99–102, 110–115; 340/988–996, 146.2, 500–692; 342/52, 58, 342/357.09; 379/1.01, 27.01, 29.01, 93.25; 702/127, 188; 307/9.1–10.8
See application file for complete search history.

(56) References Cited

U.S. PATENT DOCUMENTS

| 5,710,723 | A | * | 1/1998 | Hoth et al. ................. 702/181 |
| 5,737,215 | A | * | 4/1998 | Schricker et al. ............... 700/29 |
| 5,950,147 | A | * | 9/1999 | Sarangapani et al. ........ 702/179 |
| 6,028,537 | A | * | 2/2000 | Suman et al. ................. 340/988 |
| 6,330,499 | B1 | * | 12/2001 | Chou et al. ................... 701/31.4 |
| 6,338,045 | B1 | * | 1/2002 | Pappas ............................ 705/29 |
| 6,442,511 | B1 | * | 8/2002 | Sarangapani et al. ........ 702/194 |
| 6,553,336 | B1 | * | 4/2003 | Johnson et al. ............... 702/188 |

(Continued)

FOREIGN PATENT DOCUMENTS

DE   44 41 101 A1   11/1994
GB   2 388 666 A   11/2003

(Continued)

OTHER PUBLICATIONS

Extended European Search Report corresponding to EP Application No. 05807123.4-211, 1852322 PCT/JP2005020915, dated May 12, 2010.

Primary Examiner — Jonathan M Dager (57) ABSTRACT

A center control unit (11) of a center unit (4) generates assessment information corresponding to the strictness of the usage conditions for a specified component based on operation data stored in an operation data accumulation unit (13) received by an in-vehicle terminal (2) and assessment regulations stored in an assessment regulation storage unit (14), and generates report information for displaying a report in a form allowing comparison of this generated assessment information to relative comparison assessment information stored in an assessment information storage unit (15). A transmitter-receiver (12) transmits the report information generated by the center control unit (11) to a user terminal (3).

8 Claims, 3 Drawing Sheets

U.S. PATENT DOCUMENTS

| | | | |
|---|---|---|---|
| 6,834,256 B2 * | 12/2004 | House et al. | 702/181 |
| 6,859,831 B1 * | 2/2005 | Gelvin et al. | 709/224 |
| 7,020,701 B1 * | 3/2006 | Gelvin et al. | 709/224 |
| 7,023,332 B2 | 4/2006 | Saito et al. | 340/438 |
| 7,129,825 B2 * | 10/2006 | Weber | 340/425.5 |
| 7,171,188 B1 * | 1/2007 | Watanabe et al. | 455/404.1 |
| 7,418,321 B2 * | 8/2008 | Boutin | 701/31.7 |
| 7,450,030 B2 * | 11/2008 | Ringel et al. | 340/999 |
| 7,502,673 B2 * | 3/2009 | Robinson et al. | 701/31.4 |
| 7,668,632 B2 * | 2/2010 | Vian et al. | 701/29.3 |
| 7,714,705 B2 * | 5/2010 | Rennie et al. | 340/426.16 |
| 7,734,287 B2 * | 6/2010 | Ying | 455/423 |
| 2002/0059075 A1 | 5/2002 | Schick et al. | |
| 2002/0173885 A1 | 11/2002 | Lowrey et al. | |
| 2003/0137194 A1 * | 7/2003 | White et al. | 307/10.1 |
| 2005/0102074 A1 * | 5/2005 | Kolls | 701/29 |
| 2006/0064291 A1 * | 3/2006 | Pattipatti et al. | 703/14 |
| 2006/0229777 A1 * | 10/2006 | Hudson et al. | 701/29 |
| 2007/0250228 A1 * | 10/2007 | Reddy et al. | 701/29 |
| 2008/0004840 A1 * | 1/2008 | Pattipatti et al. | 702/183 |

FOREIGN PATENT DOCUMENTS

| | | |
|---|---|---|
| JP | 5-81502 A | 4/1993 |
| JP | 2000-194895 A | 7/2000 |
| JP | 2002-150468 A | 5/2002 |
| JP | 2003-137079 A | 5/2003 |
| JP | 2003-208696 A | 7/2003 |
| JP | 2003-346010 A | 12/2003 |
| JP | 2004-179346 A | 6/2004 |

* cited by examiner

IN-VEHICLE COMPONENT ASSESSMENT SYSTEM

TECHNICAL FIELD

The present invention relates to an in-vehicle component assessment system for assessing strictness of usage conditions for a specified component equipped in a vehicle.

BACKGROUND ART

There is a system of monitoring an in-vehicle component based on data acquired from a vehicle; wherein the system finds in advance mileage (replacement reference mileage) of the vehicle, which is a measure for component replacement time, compares this replacement reference mileage and actual mileage, and notifies the user that it is the component replacement time when the actual mileage reaches the replacement reference mileage.

[Patent Document 1] Japanese Unexamined Patent Application Publication No. 2003-137079
[Patent Document 2] Japanese Unexamined Patent Application Publication No. 2003-346010

DISCLOSURE OF INVENTION

Problem to be Solved by the Invention

However, degree of abrasion and deterioration (lifetime) of the in-vehicle component changes according to usage conditions such as how the vehicle equipped with the component is driven, its purpose, or environment in which it is used. As a result, there are cases where the replacement time is notified based on the mileage regardless that continued use is still possible. In these cases, even if the driver of the vehicle can speculate strictness of the usage conditions subjectively, objective evaluation is impossible, and appropriate determination of component replacement time is difficult.

The present invention is created with consideration for the above-described problem, and aims to provide an in-vehicle component assessment system capable of providing the strictness of usage conditions for a specified component equipped in a vehicle to a user in an easily assessable form.

Means of Solving the Problem

In order to solve the above-described problem, the present invention is an in-vehicle component assessment system for assessing the strictness of usage conditions for a specified component in a vehicle, and includes an in-vehicle terminal and a center unit.

The in-vehicle terminal is equipped in the vehicle and has an operation data acquisition unit and an operation data output unit. The operation data acquisition unit sequentially acquires operation data regarding a specified component. The operation data output unit outputs operation data received by the operation data acquisition unit to the outside.

The center unit has an operation data input unit, an operation data storage unit, an assessment regulation storage unit, an assessment information storage unit, a center control unit, and a report information output unit. The operation data input unit receives operation data output from the operation data output unit. The operation data storage unit stores the operation data received by the operation data input unit. The assessment regulation storage unit is prestored with assessment regulations, which regulate the relationship between operation data and assessment information corresponding to the strictness of the usage conditions for the specified components equipped in a vehicle. The assessment information storage unit is prestored with relative comparison assessment information which is a reference for determining the strictness of the usage conditions for the specified component. The center control unit generates assessment information of a specified component based on the operation data stored in the operation data storage unit and the assessment regulations stored in the assessment regulation storage unit, and generates report information for displaying a report in a form allowing comparison of this generated assessment information to the relative comparison assessment information stored in the assessment information storage unit. The report information output unit outputs the report information generated by the center control unit to the outside.

With the above-given configuration, the center control unit of the center unit generates assessment information of the specified component corresponding to the strictness of the usage conditions based on the operation data stored in the operation data storage unit and the assessment regulations stored in the assessment regulation storage unit, and generates report information based on this generated assessment information. This report information is information representing a report in a form allowing comparison of this generated assessment information to the relative comparison assessment information, and is output to the outside from the report information output unit. Furthermore, the assessment information of the specified component displayed in the report indicates strictness of the usage conditions and does not directly indicate deterioration, abrasion and the like of the specified component.

Accordingly, a user such as the vehicle driver or an operation manager outputs and displays the report in a form allowing comparison of the assessment information of the specified component to the relative comparison assessment information using the report information output from the report information output unit of the center unit so as for him/her to look at the report. This allows objective assessment of the strictness of the usage conditions for the specified component and appropriate determination of component replacement time with reference to this assessment. More specifically, in the case of special usage conditions and not typical applications of the vehicle, replacement of the specified component is possible regardless of operating time or mileage. As a method for the user to look at the report, there is, for example, a method of loading the report information onto his/her own terminal and displaying it on a display, and a method of printing using a printer.

Furthermore, since the above-mentioned report is in a form allowing comparison of the assessment information of the specified component to the relative comparison assessment information, the user may easily determine the strictness of the usage conditions for the specified component.

Use of the strictness of the usage conditions represented in the above-given report as a reference for accurate determination of driving operations allows the operation manager to influence the driver of the vehicle to drive so as to reduce the strictness of the usage conditions, thereby increasing the lifetime of the specified component.

Furthermore, multiple pieces of assessment information generated and accumulated based on operation data previously acquired by the in-vehicle terminal of the same vehicle, multiple pieces of assessment information generated based on operation data acquired by in-vehicle terminals of other multiple vehicles, and assessment information generated based on virtual driving operation data separately set as a goal may be used as the relative comparison assessment information. When the assessment information based on past operation data of the same vehicle is used for relative comparison, strictness of usage conditions for the specified component may be assessed through comparison of past driving and current driving. When the assessment information based on operation data of other vehicles is used for relative comparison, strictness of usage conditions for the specified component may be assessed by comparison to driving by other drivers. When the assessment information based on past virtual driving operation data separately set as a goal is used as the relative comparison assessment information, strictness of usage conditions for the specified component may be assessed by comparison to ideal driving. Accordingly, by using these pieces of relative comparison assessment information, the driver may be encouraged to drive so as to be more effectively kind to the specified component, and more appropriately determine component replacement time according to operating condition of the vehicle.

Furthermore, the in-vehicle component assessment system may include a user terminal connected to the center unit via a predetermined network. In this case, the report information output unit is constituted by a transmitter-receiver, which transmits and receives information via the network, and when the user terminal transmits report request information requesting provision of report information to the center unit via the network, and the transmitter-receiver of the center unit receives this report request information, report information generated by the center control unit may be transmitted to the user terminal via the network.

With this configuration, upon reception of the report request information from the user terminal, the transmitter-receiver of the center unit transmits the report information to the user terminal. Accordingly, the user terminal acquires the report information from the center unit as needed so as to provide it to the user without regularly storing operation data and assessment information which are huge quantities of data. Moreover, since respective user terminals of multiple users are connected to the center unit via the network, report information may be provided in conformity with a request to each of the users (each of the user terminals) from a single center unit.

The center control unit may accumulate and store in the assessment information storage unit the assessment information generated based on the operation data and the assessment regulations as relative comparison assessment information.

With this configuration, multiple pieces of assessment information generated and accumulated based on operation data previously acquired by the in-vehicle terminal of the same vehicle may be used as the relative comparison assessment information, and strictness of usage conditions for the specified component may be assessed through comparison of past driving and current driving.

Moreover, the in-vehicle terminal may be equipped on multiple vehicles. In this case, the center unit may be configured such that: the operation data input unit receives operation data output from the operation data output unit of the respective in-vehicle terminals; the operation data storage unit accumulates and stores the operation data input to the operation data input unit associated to the vehicles, which are the sources of the data, and dates of data acquisition; and the center control unit generates assessment information for the specified component in the respective vehicles based on the operation data stored in the operation data storage unit and the assessment regulations stored in the assessment regulation storage unit, accumulates and stores these generated multiple pieces of assessment information as relative comparison assessment information in the assessment information storage unit, and generates report information to display a report in a form allowing comparison of the generated respective pieces of assessment information to the multiple pieces of relative comparison assessment information stored in the assessment information storage unit. Furthermore, the report may include at least one of existence rate of multiple pieces of relative comparison assessment information, a mean value, and a histogram.

With this configuration, multiple pieces of assessment information generated based on operation data acquired by the in-vehicle terminals of other multiple vehicles may be used as the relative comparison assessment information, and strictness of usage conditions for the specified component may be assessed by comparison to driving by the other drivers.

Furthermore, since the report includes at least one of existence rate of multiple pieces of relative comparison assessment information, a mean value, and a histogram, the user may easily visually grasp the strictness of the usage conditions for the specified component.

Effects of Invention

According to the in-vehicle component assessment system of the present invention, the user may receive a report specifying the strictness of the usage conditions for an in-vehicle component in an easily assessable form.

DESCRIPTION OF REFERENCE NUMERALS

1: vehicle
2: in-vehicle terminal
3: user terminal
4: center unit
5: network
9: transmitter-receiver (operation data output unit)
10: operation data acquisition unit
11: center control unit
12: transmitter-receiver (operation data input unit and report data output unit)
13: operation data accumulation unit (operation data storage unit)
14: assessment regulation accumulation unit (assessment regulation storage unit)
15: assessment data accumulation unit (assessment data storage unit)

BEST MODE FOR CARRYING OUT THE INVENTION

An embodiment of the present invention is described forthwith based on the appended drawings.

Figure 1:
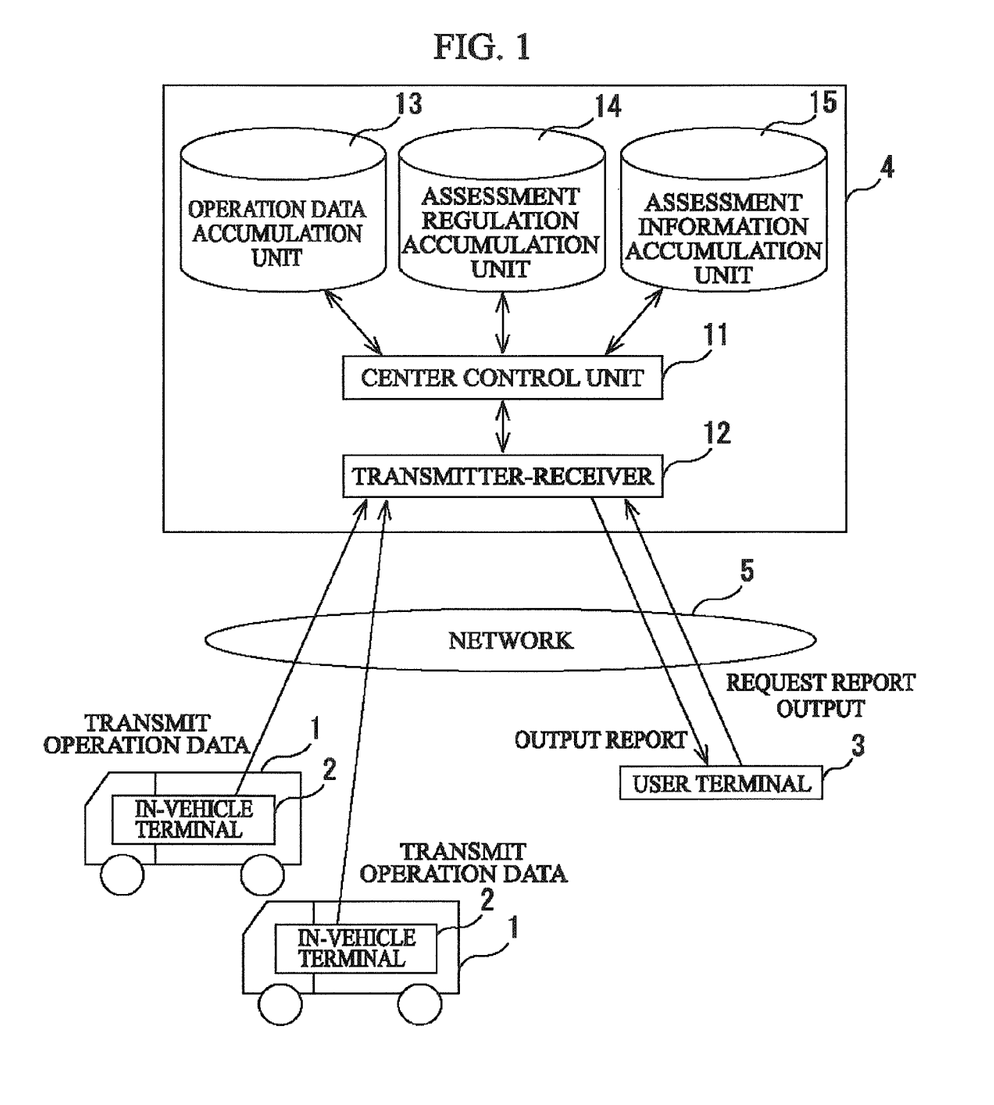
FIG. 1 is a block diagram schematically showing an in-vehicle component assessment system according to an embodiment of the present invention.
Figure 2:
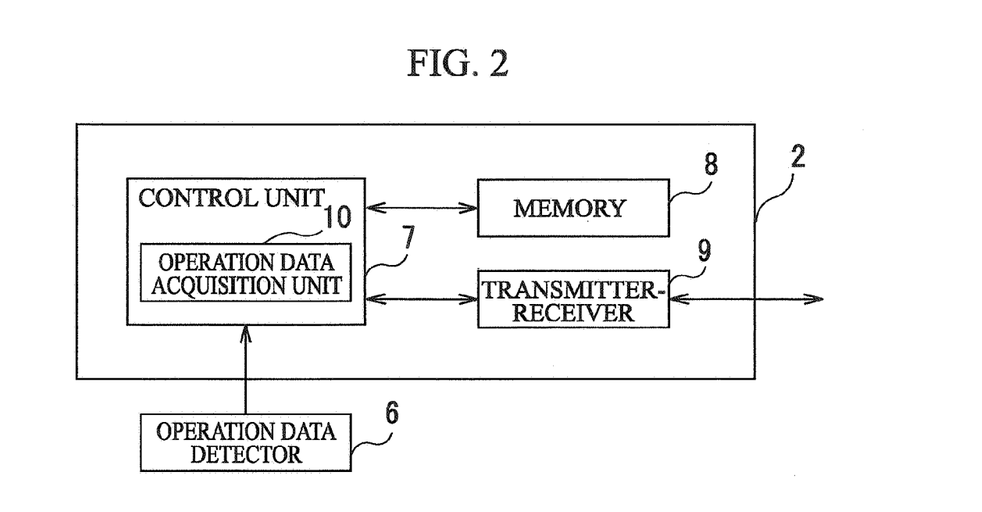
FIG. 2 is a block diagram schematically showing an in-vehicle terminal.
Figure 3:
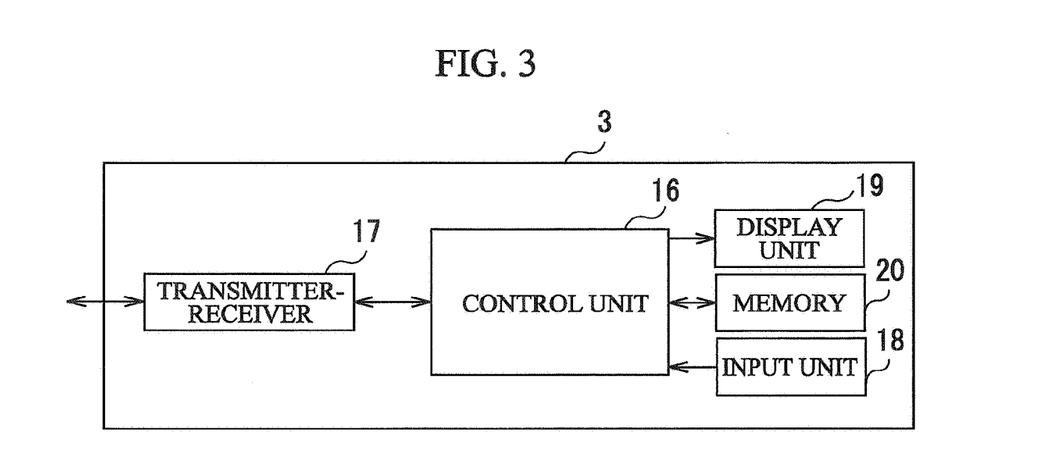
FIG. 3 is a block diagram schematically showing a user terminal of FIG. 1.
Figure 4:
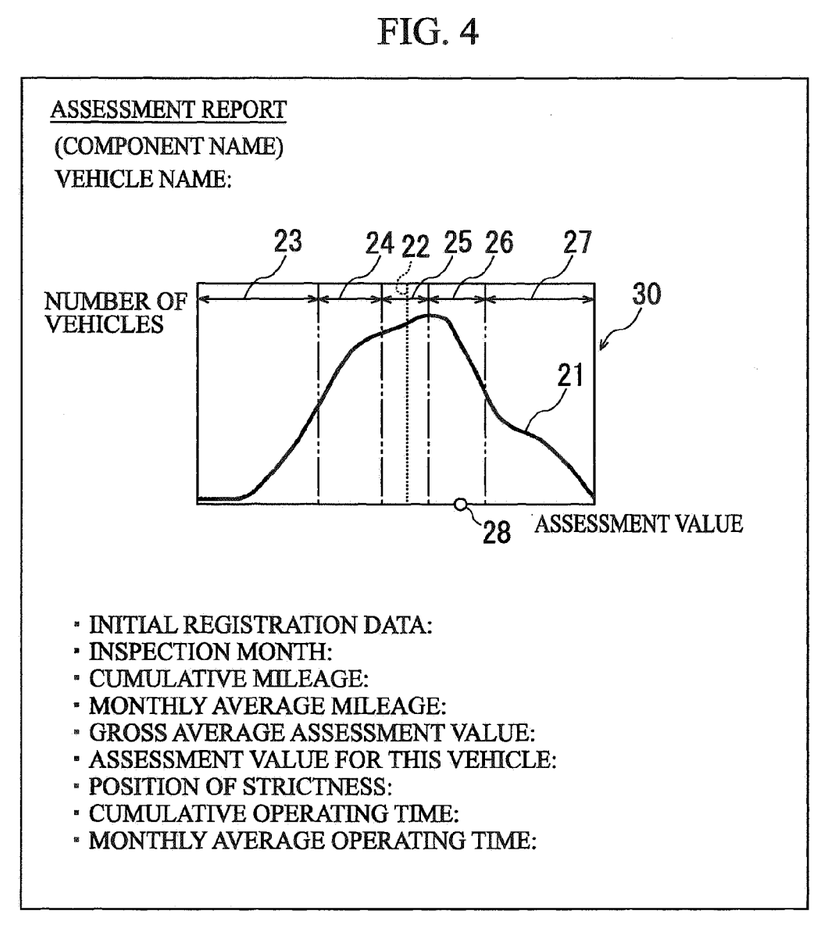
FIG. 4 is a diagram schematically showing an exemplary displayed assessment report.

FIG. 1 is a block diagram schematically showing an in-vehicle component assessment system according to an embodiment of the present invention. FIG. 2 is a block diagram schematically showing an in-vehicle terminal of FIG. 1. FIG. 3 is a block diagram schematically showing a user terminal of FIG. 1. FIG. 4 is a diagram schematically showing an exemplary displayed assessment report.

As shown in FIG. 1, the in-vehicle component assessment system according to the present invention includes in-vehicle terminals 2, which are provided in respective vehicles 1, a user terminal 3, which is manipulated by a user, and a center unit 4, which is used as a relay management unit provided at a system operating company providing the in-vehicle component assessment system. Information identifying all of the respective vehicles provided with the in-vehicle component assessment system is pre-registered to the center unit 4. Furthermore, the user includes various persons related to the vehicles 1 such as a driver of a vehicle 1, operation manager of a delivery company managing the vehicles 1, a maintenance worker of the vehicles 1, and a distributor of the vehicles 1; and the user terminal 3 includes various fixed terminals and mobile terminals operable by the user.

The in-vehicle terminals 2 and the user terminal 3 basically function as computers, and the center unit 4 basically functions as a server.

Each of the respective in-vehicle terminals 2 is connected to the center unit 4 via a predetermined network 5 allowing remote communication, and the user terminal 3 is connected to the center 4 via the same network 5. The center unit 4 relays transmission and reception of information between the in-vehicle terminals 2 and the user terminal 3. While the in-vehicle terminals 2, the user terminal 3, and the center unit 4 may be connected to each other via the same network, in this embodiment, each of the in-vehicle terminals 2 is connected to the center unit 4 via a packet communications network, which uses cellular phone lines, so as to allow wireless communication, and the operation management terminal 3 is connected to the center unit 4 via the Internet. Furthermore, while it is not shown in the drawing, the center unit 4 is connected to multiple distributing company user terminals 3 and multiple in-vehicle terminals 2 in respective vehicles 1 managed by respective distributing companies.

With this in-vehicle component assessment system, each of the in-vehicle terminals 2 sequentially acquires operation data regarding specified components of the respective vehicles 1, and transmits the acquired operation data to the center unit 4 at predetermined timings. The center unit 4 generates assessment information corresponding to the strictness of the usage conditions for the specified component within a predetermined period based on the operation data transmitted from the respective in-vehicle terminals 2. This assessment information indicates the strictness of usage of the specified component, which varies depending on how the vehicle 1 is driven, and does not directly indicate the lifetime of the specified component, and is obtained from the operation data of the vehicle 1 according to predetermined assessment regulations.

The center unit 4 generates report information for effectively utilizing the generated assessment information. This report information is information used for displaying a report in a form allowing comparison of this generated assessment information to the relative comparison assessment information. In this embodiment, assessment information of the same specified component in other multiple vehicles during the same period as the above-given predetermined period is used as the relative comparison assessment information. When report request information is transmitted from the user terminal 3 in conformity with an input instruction from the user, the report information is transmitted to the user terminal 3 from the center unit 4. Note that while, in this embodiment, starter, AC generator, engine, oil, clutch, brake lining, and battery are selected as specified components (to-be-assessed components) of the in-vehicle components to be assessed in terms of strictness of usage conditions, other components may also be subjects.

Each of the vehicles 1 are provided with an operation data detector 6 in addition to the in-vehicle terminal 2, as shown in FIG. 2. The operation data detector 6 sequentially acquires operation data regarding the above-mentioned to-be-assessed components. The operation data acquired in this embodiment includes engine coolant temperature, engine cranking on/off information, ignition on/off information, engine RPM, engine rotational time, engine stopping time, engine torque, mileage, and vehicle speed, and operation data acquired by the operation data detector 6 is sequentially output to the in-vehicle terminal 2. Note that the operation data acquired by the operation data detector 6 is appropriately set according to the to-be-assessed component. Furthermore, while the operation data detector 6 may be provided to the vehicles 1 as individual sensors, it is preferable to use the engine-control computer as the operation data detector 6 when an engine-control computer receives the operation data.

The in-vehicle terminal 2 includes a control unit 7, memory 8, and a transmitter-receiver (operation data output unit) 9. The control unit 7 is constituted by a central processing unit (CPU) and includes an operation data acquisition unit 10. The operation data acquisition unit 10 acquires the above-mentioned operation data from the operation data detector 6. The control unit 7 accumulates and stores each of the pieces of operation data associated with corresponding acquisition time in the memory 8. The control unit 7 reads out the operation data accumulated in the memory 8 during every predetermined period, and transmits it to the center unit 4 from the transmitter-receiver 9. Note that transmission of the operation data to the center unit 4 from the transmitter-receiver 9 may be carried out upon reception of a transmission request from the center unit 4.

As shown in FIG. 1, the center unit 4 has a center control unit 11, a transmitter-receiver (operation data input unit and a report information output unit) 12, an operation data accumulation unit (operation data storage unit) 13, an assessment regulation accumulation unit (assessment regulation storage unit) 14, and an assessment information accumulation unit (assessment information storage unit) 15. The transmitter-receiver transmits and receives information between the respective in-vehicle terminals 2 and the user terminal 3 via the network 5.

The transmitter-receiver 12 receives operation data transmitted from the in-vehicle terminal 2 of the respective vehicles 1. The center control unit 11 accumulates and stores the operation data received by the transmitter-receiver 12 in the operation data accumulation unit 13. At this time, the operation data is stored associated to corresponding vehicle, which is the source of the data, and corresponding date of data acquisition.

Assessment regulations for every specified component to be assessed are prestored in the assessment regulation accumulation unit 14. These assessment regulations specify the relationship between the assessment information indicating the strictness for usage conditions for the to-be-assessed component and predetermined operation data acquired by the vehicle 1, and are constituted by relational expressions or tables.

The center control unit 11 is constituted by a CPU, reads out the operation data accumulated in the operation data accumulation unit 13 and the assessment regulations prestored in the assessment regulation accumulation unit 14 during every predetermined period (once a month in this embodiment), generates assessment information for the respective to-be-assessed components in the respective vehicles based on the read out operation data and assessment regulations, and accumulates and stores the generated multiple pieces of assessment information in the assessment information accumulation unit 15 as relative comparison assessment information. At this time, relative comparison assessment information is stored associated to the target vehicles, date of data acquisition, and to-be-assessed components.

Relationship between the operation data acquired by the center control unit 11 from the operation data accumulation unit 13, the assessment regulations set to the assessment regulation accumulation unit 14, and the assessment information generated based thereupon is now described.

In the case where the to-be-assessed component is the starter, the center control unit 11 acquires total cranking time for each of divided, predetermined temperature ranges of engine coolant (total cranking time for each temperature range). This total cranking time for each temperature range may be calculated by the center control unit 11, or the time may be precalculated by the control unit 7 of the in-vehicle terminal 2 and then transmitted to the center unit 4. The center control unit 11 multiplies each total cranking time for each temperature range by a predetermined coefficient, and then integrates those multiplied values. Furthermore, the integrated value is divided by total mileage for the above-mentioned predetermined period, resulting in a calculation (assessment value) as the assessment information for the starter. This assessment value for the starter is cranking time per unit interval mileage taking engine coolant temperature into account, and indicates that the longer the cranking time, the higher the possibility that the starter is being used in a strict manner.

In the case where the to-be-assessed component is an AC generator, the center control unit 11 acquires an integrated value by integrating the multiplied values of the respective engine RPMs and corresponding pulley ratios (pulley ratio of a belt connecting the engine to the AC generator) over time. This integrated value may be calculated by the center control unit 11, or the value may be precalculated by the control unit 7 of the in-vehicle terminal 2 and then transmitted to the center unit 4. The center control unit 11 then divides the integrated value by total mileage for the above-mentioned predetermined period, resulting in a calculation (assessment value) as the assessment information for the AC generator. This assessment value for the AC generator is total RPM for the AC generator per unit interval mileage, and indicates that the greater the total RPM, the higher the possibility that the AC generator is being used in a strict manner. In the case where the to-be-assessed component is engine oil, the center control unit 11 acquires an integrated value by integrating the multiplied values of respective torques and corresponding engine RPMs over time. This integrated value may be calculated by the center control unit 11, or the value may be precalculated by the control unit 7 of the in-vehicle terminal 2 and then transmitted to the center unit 4. The center control unit 11 then divides the integrated value by total mileage for the above-mentioned predetermined period, resulting in a calculation (assessment value) as the assessment information for the engine oil. From the fact that engine oil deteriorates depending on both torque and engine RPM, it indicates that the greater the above-given assessment value, the higher the possibility that the engine oil is being used in a strict manner.

In the case where the to-be-assessed component is the clutch, the center control unit 11 integrates times when the driving speed is below a certain value excluding when at a halt and the clutch is interrupted or inadequately connected (time when the clutch switch is on). This integrated value may be calculated by the center control unit 11, or the value may be precalculated by the control unit 7 of the in-vehicle terminal 2 and then transmitted to the center unit 4. The center control unit 11 then divides the integrated value by total mileage for the above-mentioned predetermined period, resulting in a calculation (assessment value) as the assessment information for the clutch. From the fact that time when the clutch switch is off and the speed is below a certain value increases depending on a half clutch state when the vehicle starts moving, it indicates that the greater the above-given assessment value, the higher the possibility that the clutch is being used in a strict manner.

In the case where the to-be-assessed component is the braking lining, the center control unit 11 acquires initial velocity and terminal velocity when the vehicle speed decreases. Next, total absorbed kinetic energy is calculated from the initial velocity and terminal velocity, and kinetic energy absorbed due to contributing factors other than foot brake (e.g., engine brake, exhaust brake, retarder) is subtracted from the total kinetic energy, thereby finding the absorbed energy by the brake lining at every time speed decreases, and finding sum of energy absorbed during the above-mentioned predetermined period. This absorbed energy may be calculated by the center control unit 11, or the energy may be precalculated by the control unit 7 of the in-vehicle terminal 2 and then transmitted to the center unit 4. Furthermore, the absorbed energy by the brake lining may be obtained assuming the kinetic energy absorbed due to contributing factors other than the foot brake as a predetermined constant. The center control unit 11 then divides the sum of absorbed energy by total mileage for the above-mentioned predetermined period, resulting in a calculation (assessment value) as the assessment information for the brake lining. From the fact that wear and deterioration of the brake lining increases depending on the absorbed kinetic energy, it indicates that the greater the above-given assessment value, the higher the possibility that the brake lining is being used in a strict manner.

Note that the values calculated when finding the above-given assessment value is divided by the total mileage for the predetermined period in order to make the degrees of strictness of the usage conditions for the target components be comparable even when the total mileages during the predetermined period vary.

In the case where the to-be-assessed component is the battery, the center control unit 11 acquires engine rotational time and engine stopping time. Sufficiency rate (assessment value) is found by dividing the engine rotational time by the engine stopping time so as to generate the sufficiency as assessment information for the battery. The lower the sufficiency rate, the higher the possibility that the battery is being used in a strict manner without sufficient recharging.

Furthermore, the transmitter-receiver 12 receives report request information transmitted from the user terminal 3 via the network 5. This report request information includes information specifying vehicle and information specifying period (target year and month in this embodiment). Note that the report request information may include information specifying to-be-assessed component.

When the transmitter-receiver 12 receives the report request information, the center control unit 11 reads out from the assessment information accumulation unit 15, assessment information of the to-be-assessed component (aforementioned assessment information) for the above-mentioned vehicle for the above-mentioned specified period. Note that when the assessment information for the above-mentioned specified period has not been stored in the assessment information accumulation unit 15, the latest operation data is acquired from the in-vehicle terminal 2 to generate assessment information, and the generated assessment information is stored in the assessment information accumulation unit 15.

Next, the center control unit 11 reads out as relative comparison assessment information, the assessment information for all of the to-be-assessed components for the same period as the above-mentioned specified period from the assessment information accumulated in the assessment information accumulation unit 15. For the respective to-be-assessed components, report information used for displaying a report in a form allowing comparison of assessment information for the above-mentioned specified vehicle and multiple pieces of relative comparison assessment information. The transmitter-receiver 12 transmits the report information generated by the center control unit 11 to the user terminal 3.

As shown in FIG. 3, the user terminal 3 has a control unit 16, a transmitter-receiver 17, an input unit 18, a display unit 19, and memory 20. The transmitter-receiver 17 transmits and receives information to and from the outside via the network 5. The input unit 18 has a keyboard and receives setting for the report request information and a transmission instruction input from the user. The control unit 16 is constituted by a CPU and generates report request information according to the input to the input unit 18 by the user. The transmitter-receiver 17 transmits the report request information generated by the control unit 16 to the center unit 4.

Furthermore, when the transmitter-receiver 17 receives the report information from the center unit 4, the control unit 16 stores the report information in the memory 20 and displays it on the display unit 19. The user may recognize assessed contents by looking at an assessment report displayed in the display unit 19.

FIG. 4 shows an exemplary assessment report, which is displayed based on the report information.

Displayed content of the assessment report shown in FIG. 4 includes component name, which specifies to-be-assessed component, vehicle name (vehicle identification number), which specifies vehicle, an assessment graph 30, which visually represents strictness of usage conditions, initial registration date, inspection month, cumulative mileage, monthly average mileage, gross average assessment value, assessment value for this vehicle, position of strictness, cumulative operating time, and monthly average operating time.

The horizontal axis of the assessment graph 30 gives assessment value, and the vertical axis gives number of vehicles (number of pieces of assessment information used for relative comparison). A histogram (frequency distribution) 21 representing distribution of all relative comparison assessment values and a mean value 22 of all assessment values are displayed in the assessment graph 30. Furthermore, the assessment graph 30 is divided into multiple regions 23 through 27 denoting existence rate (20% in this example) of relative comparison assessment values. For example, when the number of all relative comparison assessment values is 100, number of relative comparison assessment values included in the respective regions 23 through 27 is respectively 20. Note that color coding the respective regions 23 through 27 provides a more eye-friendly display. Moreover, a point 28 indicating position of the assessment value (aforementioned assessment value) for the to-be-assessed vehicle is displayed along the horizontal axis of the assessment graph 30.

The initial registration date is a date on which the vehicle is first registered to use this assessment system; the inspection month is the above-given specified period (assessment month); the cumulative mileage is total mileage after the initial registration; the monthly average mileage is the resulting value of dividing the cumulative mileage by the registered period (number of months); the gross average assessment value is a numerical display of the above-mentioned mean value 22; the assessment value for this vehicle is a numerical display of the aforementioned assessment value; the cumulative operating time is total vehicle operating time after the initial registration; and the monthly average operating time is the resulting value of dividing the cumulative operating time by the registered period (number of months). Note that engine driving time, time when recharging the battery, and the like are used as the vehicle operating time.

Furthermore, the position of strictness is defined as a value obtained by converting existence rate of the aforementioned assessment value or deviation value relative to all of the relative comparison assessment values to a numeral ranging from 1 to 100 and displayed.

Overall processing of the in-vehicle component assessment system is described forthwith divided into assessment information generation processing and report information acquisition processing.

In the assessment information generation processing, each of the in-vehicle terminals 2 of the respective vehicles 1 preregistered in the center unit 4 sequentially acquires operation data, and transmits the acquired operation data to the center unit 4 at predetermined timings. With the center unit 4, each time the transmitter-receiver 12 receives operation data, that operation data is accumulated in the operation data accumulation unit 13 by the center control unit 11. The center control unit 11 then reads out the accumulated operation data from the operation data accumulation unit 13 and corresponding assessment regulations from the assessment regulation accumulation unit 14, generates assessment information for the to-be-assessed components for the predetermined period, and accumulates the generated assessment information as the aforementioned assessment information and the relative comparison assessment information in the assessment information accumulation unit 15.

In the report information acquisition processing, first the input unit 18 of the user terminal 3 receives from the user an instruction to transmit report request information, and then the transmitter-receiver 17 transmits the report request information to the center unit 4 according thereto. With the center unit 4, the transmitter-receiver 12 receives the report request information, and the center control unit 11 reads out the aforementioned assessment information and all of the relative comparison assessment information from the assessment information accumulation unit 15 according thereto, and generates report information for each of the to-be-assessed components. Report information for each of the respective to-be-assessed components generated by the center control unit 11 is collected for each vehicle and transmitted to the user terminal 3 from the transmitter-receiver 12. With the user terminal 3, when the transmitter-receiver 17 receives the report information from the center unit 4, the control unit 16 stores the report information in the memory 8 and displays it on the display unit 19 according thereto.

According to the this embodiment, looking at the assessment report allows objective assessment of the strictness of the usage conditions for the specified components, and appropriate determination of component replacement time with reference to this assessment. More specifically, in the case of special usage conditions and not typical applications of the vehicle 1, replacement of the specified component is possible regardless of operating duration or mileage.

Furthermore, since the existence rate of all of the relative comparison assessment values (the regions 23 through 27), the mean value 22, and the histogram 21 along with the aforementioned assessment value (the point 28) are given in the assessment graph 30 of the assessment report, the user may easily visually grasp the strictness of usage conditions for the specified components.

Use of the aforementioned assessment value as a reference for determining accuracy of driving operations may influence the driver of the vehicle 1 to drive so as to reduce the strictness of the usage conditions, thereby increasing the lifetimes of the specified components.

Furthermore, since the assessment information of the same components of other vehicles for the same period is used as the relative comparison assessment information, strictness of usage conditions for the specified components may be assessed by comparison to driving by the other drivers.

Upon reception of the report request information from the user terminal 3, the transmitter-receiver 12 of the center unit 4 transmits the report information to the user terminal 3. Accordingly, the user terminal 3 acquires the report information from the center unit 4 as needed so as to provide it to the user without regularly storing operation data and assessment information which are huge quantities of data.

Moreover, since respective user terminals 3 of multiple users are connected to the center unit 4 via the network 5, report information may be provided by request to each of the users (each of the user terminals 3) from a single center unit 4.

Note that a configuration in which the operation data acquired by the in-vehicle terminals 2 is stored in a recording medium and the center unit 4 acquires the operation data from that recording medium without the in-vehicle terminals 2 being connected to the center unit 4 via the network 5 may be used.

Similarly, a configuration in which the report information generated by the center unit 4 is stored in a recording medium and the user terminals 3 acquire the report information from that recording medium without the user terminals 3 being connected to the center unit 4 via the network 5 may be used. Furthermore, the report information may be printed out by a printer on the center unit 4 side and delivered to the users.

Moreover, the assessment report may be provided to the users by providing printers on the user sides and printing out the report information acquired by the user terminals 3.

Furthermore, multiple pieces of assessment information generated and accumulated based on operation data previously acquired by the in-vehicle terminal 2 of the same vehicle, and assessment information generated based on virtual driving operation data separately set as a goal may be used as the relative comparison assessment information. When the assessment information based on past operation data of the same vehicle is used for relative comparison, strictness of usage conditions for the specified component may be assessed through comparison of past driving and current driving. When the assessment information based on virtual driving operation data set as a goal is used for relative comparison, strictness of usage conditions for the specified component may be assessed by comparison to ideal driving.

Moreover, the vehicles registered to the center unit 4 may be pre-classified according to usage, engine displacement, weight, and the like so as to limit the assessment information used for relative comparison to assessment information acquired from the classified vehicles to which the to-be-assessed vehicles belong. This allows accurate assessment of the strictness of usage conditions for the specified components according to features of the vehicles in which the specified components are equipped.

INDUSTRIAL APPLICABILITY

The present invention may be applied to various in-vehicle component assessment systems for vehicles.

The invention claimed is:

1. An in-vehicle component assessment system for assessing severity of usage conditions degree for a specified component equipped in a vehicle, said system comprising:
   an in-vehicle terminal, which is equipped in the vehicle and comprises:
      an operation data acquisition unit, which sequentially, over time, acquires operation data regarding the specified component, and
      an operation data output unit, which outputs the operation data acquired by the operation data acquisition unit; and
   a center unit comprising:
      an operation data input unit, which receives the operation data output from the operation data output unit,
      an operation data storage unit, which stores the operation data received by the operation data input unit,
      an assessment regulation storage unit, which is prestored with assessment regulations which specify a relationship between the operation data and assessment information corresponding to degrees of the severity of the usage conditions for the specified component,
      an assessment information storage unit, which is prestored with relative comparison assessment information which is a reference for determining a value of the degree of the severity of the usage conditions for the specified component,
      a center control unit, which generates assessment information of the specified component based on the operation data stored in the operation data storage unit and the assessment regulations stored in the assessment regulation storage unit, and generates report information for producing a report to compare the generated assessment information to the relative comparison assessment information, and
      a report information output unit, which outputs the report information generated by the center control unit; and
   a user terminal which comprises a display unit and is connected to the center unit via a predetermined network, wherein:
   the report information output unit of the center unit is a transmitter-receiver which transmits and receives information via the network,
   the user terminal transmits report request information requesting provision of the report information to the center unit via the network,
   the transmitter-receiver of the center unit transmits the report information generated by the center control unit to the user terminal upon reception of the report request information,
   the display unit displays the report information received by the user terminal,
   the assessment information of the specified component displayed in the report includes the value of the degree of the severity of usage conditions for the specified component,
   the generated assessment information corresponds to a specific vehicle, the relative comparison assessment information includes assessment information corresponding to other vehicles, and the report is displayed in a user viewable form to compare the assessment information corresponding to the specific vehicle in a predetermined period to the relative comparison assessment information corresponding to the other vehicles in the predetermined period.

2. The in-vehicle component assessment system of claim 1 in which the in-vehicle terminal is equipped in respective vehicles, wherein in the center unit:

the operation data input unit receives operation data output from operation data output units of the respective in-vehicle terminals;

the operation data storage unit accumulates and stores the operation data input to the operation data input unit associated to the vehicles, which are sources of the operation data; and the center control unit generates assessment information for the specified component in the respective vehicles based on the operation data stored in the operation data storage unit and the assessment regulations stored in the assessment regulation storage unit, accumulates and stores generated multiple pieces of assessment information as relative comparison assessment information in the assessment information storage unit, and generates report information to display a report in a form allowing comparison of the generated respective pieces of assessment information to the multiple pieces of relative comparison assessment information stored in the assessment information storage unit; and wherein the report includes at least one of existence rate of the multiple pieces of relative comparison assessment information, a mean value, and a histogram.

3. The in-vehicle component assessment system of claim 1, wherein the value of the degree of the severity of usage conditions does not directly indicate a lifetime of the specified component.

4. The in-vehicle component assessment system of claim 1, wherein the report further includes a numerical value of an existent assessment value of the specified component.

5. The in-vehicle component assessment system of claim 4, wherein a greater existent assessment value of the specified component corresponds to a higher degree of the severity of usage conditions of the specified component.

6. The in-vehicle component assessment system of claim 4, wherein the relative assessment information includes multiple relative comparison assessment values and the value of the degree of the severity of usage conditions is determined by converting the existent assessment value of the specified component in relation to the relative comparison assessment values, to a numeral in a range from 1 to 100.

7. The in-vehicle component assessment system of claim 6, wherein a greater value of the degree of the severity of usage conditions corresponds to harsher usage conditions of the specified component.

8. An in-vehicle component assessment system for assessing severity of usage conditions degree for a specified component equipped in a vehicle, the system comprising:

an in-vehicle terminal, which is equipped in the vehicle and comprises:

an operation data acquisition unit, which sequentially, over time, acquires operation data regarding the specified component, and an operation data output unit, which outputs the operation data acquired by the operation data acquisition unit; and a center unit comprising:

an operation data input unit, which receives the operation data output from the operation data output unit, a non-transitory operation data storage unit, which stores the operation data received by the operation data input unit, a non-transitory assessment regulation storage unit, which is prestored with assessment regulations which specify a relationship between the operation data and assessment information corresponding to degrees of the severity of the usage conditions for the specified component, a non-transitory assessment information storage unit, which is prestored with relative comparison assessment information which is a reference for determining a value of the degree of the severity of the usage conditions for the specified component, a center control unit, which generates assessment information of the specified component based on the operation data stored in the non-transitory operation data storage unit and the assessment regulations stored in the non-transitory assessment regulation storage unit, and generates report information for producing a report to compare the generated assessment information to the relative comparison assessment information, and a report information output unit, which outputs the report information generated by the center control unit, wherein the assessment information of the specified component displayed in the report includes the value of the degree of the severity of usage conditions for the specified component, the generated assessment information corresponds to a specific vehicle, the relative comparison assessment information includes assessment information corresponding to other vehicles, and the report is displayed in a user viewable form to compare the assessment information corresponding to the specific vehicle in a predetermined period to the relative comparison assessment information corresponding to the other vehicles in the predetermined period.

* * * * *